US009254523B2

(12) United States Patent
Yang et al.

(10) Patent No.: US 9,254,523 B2
(45) Date of Patent: Feb. 9, 2016

(54) LATHE WITH TWO CROSS BEAMS

(71) Applicants: Ming-Lu Yang, New Taipei (TW);
Tian-En Zhang, Shenzhen (CN);
Ya-Dong Zhang, Shenzhen (CN);
Jian-Shi Jia, Shenzhen (CN);
Yang-Mao Peng, Shenzhen (CN);
Wei-Chuan Zhang, Shenzhen (CN);
Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN);
Zhen-Zhou Tian, Shenzhen (CN);
Bao-Peng Li, Shenzhen (CN); Jian-Min Yu, Shenzhen (CN)

(72) Inventors: Ming-Lu Yang, New Taipei (TW);
Tian-En Zhang, Shenzhen (CN);
Ya-Dong Zhang, Shenzhen (CN);
Jian-Shi Jia, Shenzhen (CN);
Yang-Mao Peng, Shenzhen (CN);
Wei-Chuan Zhang, Shenzhen (CN);
Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN);
Zhen-Zhou Tian, Shenzhen (CN);
Bao-Peng Li, Shenzhen (CN); Jian-Min Yu, Shenzhen (CN)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 330 days.

(21) Appl. No.: 13/705,585

(22) Filed: Dec. 5, 2012

(65) Prior Publication Data

US 2014/0020524 A1 Jan. 23, 2014

(30) Foreign Application Priority Data

Jul. 20, 2012 (CN) .......................... 2012 1 2528573

(51) Int. Cl.
*B23B 5/00* (2006.01)
*B23B 3/16* (2006.01)
*B23Q 1/01* (2006.01)
*B23Q 1/62* (2006.01)
*B23B 3/06* (2006.01)

(52) U.S. Cl.
CPC . *B23B 3/161* (2013.01); *B23B 3/06* (2013.01); *B23Q 1/012* (2013.01); *B23Q 1/626* (2013.01); *B23B 2270/12* (2013.01); *Y10T 82/2511* (2015.01)

(58) Field of Classification Search
CPC .................................. B23Q 4/01; B23B 21/00
USPC ........... 82/124, 132, 137, 139, 122, 149, 11.1
See application file for complete search history.

(56) References Cited

U.S. PATENT DOCUMENTS

| | | | | | |
|---|---|---|---|---|---|
| 113,651 | A | * | 4/1871 | Gray | 82/122 |
| 430,293 | A | * | 6/1890 | Knowlton | 29/29 |
| 683,592 | A | * | 10/1901 | Bullard | 29/29 |
| 738,471 | A | * | 9/1903 | Nardin | 29/29 |
| 1,034,150 | A | * | 7/1912 | Silberman | 82/122 |
| 1,410,450 | A | * | 3/1922 | Bullard, Jr. | 82/122 |
| 1,475,255 | A | * | 11/1923 | Trosch | 82/122 |
| 1,492,103 | A | * | 4/1924 | Parkes | 82/122 |
| 2,094,816 | A | * | 10/1937 | Poppensieker | 29/39 |
| 2,154,326 | A | * | 4/1939 | Anatol | 82/122 |
| 2,202,766 | A | * | 5/1940 | Trosch | 173/148 |
| 2,405,387 | A | * | 8/1946 | Yeomans et al. | 82/122 |
| 2,564,180 | A | * | 8/1951 | Turrettini | 74/89.38 |
| 2,699,695 | A | * | 1/1955 | Addison | 82/122 |
| 3,043,011 | A | * | 7/1962 | Wegmuller | 82/122 |
| 3,057,234 | A | * | 10/1962 | Heer | 82/117 |
| 3,244,037 | A | * | 4/1966 | Ruehmer | 82/122 |
| 3,511,121 | A | * | 5/1970 | Ferri et al. | 82/19 |
| 3,742,791 | A | * | 7/1973 | Sato | 82/122 |
| 3,895,424 | A | * | 7/1975 | Hautau | 29/38 C |
| 3,983,769 | A | * | 10/1976 | McConnell et al. | 82/1.11 |
| 4,250,776 | A | * | 2/1981 | Morgan | 82/122 |
| 4,335,633 | A | * | 6/1982 | Boffelli | 82/148 |
| 4,821,612 | A | * | 4/1989 | Myers | 82/1.11 |
| 5,067,534 | A | * | 11/1991 | Toivio | 144/215.2 |
| 5,081,889 | A | * | 1/1992 | Takano et al. | 82/122 |
| 5,340,247 | A | * | 8/1994 | Cuneo et al. | 409/202 |
| 5,704,262 | A | * | 1/1998 | Baumbusch et al. | 82/124 |
| 6,062,117 | A | * | 5/2000 | Shoji | 82/122 |
| 6,626,058 | B2 | * | 9/2003 | Ueda et al. | 74/396 |
| 6,632,054 | B2 | * | 10/2003 | Geiger et al. | 409/202 |
| 6,655,247 | B1 | * | 12/2003 | Walker et al. | 82/122 |
| 7,013,543 | B2 | * | 3/2006 | Iwabuchi et al. | 29/27 C |
| 7,013,544 | B2 | * | 3/2006 | Yasuda et al. | 29/27 C |
| 7,124,666 | B2 | * | 10/2006 | Feinauer et al. | 82/121 |
| 7,201,546 | B2 | * | 4/2007 | Ichino et al. | 409/165 |
| 7,219,407 | B2 | * | 5/2007 | Schneider et al. | 29/27 C |
| 7,273,335 | B2 | * | 9/2007 | Furuhashi et al. | 409/202 |
| 7,416,473 | B2 | * | 8/2008 | Belli et al. | 451/5 |
| 7,506,423 | B2 | * | 3/2009 | Iwabuchi et al. | 29/27 C |
| 7,739,854 | B2 | * | 6/2010 | Yamazaki et al. | 52/844 |
| 7,901,167 | B2 | * | 3/2011 | Hamura et al. | 409/327 |
| 7,918,149 | B1 | * | 4/2011 | Bertini | 82/132 |
| 7,963,199 | B2 | * | 6/2011 | Mayfield et al. | 82/122 |
| 8,333,683 | B2 | * | 12/2012 | Kai | 483/56 |
| 8,413,557 | B2 | * | 4/2013 | Akiyama et al. | 82/118 |
| 8,562,497 | B2 | * | 10/2013 | Tanizaki et al. | 483/3 |

(Continued)

FOREIGN PATENT DOCUMENTS

CN 201415278 Y 3/2010
CN 102049705 A 5/2011

(Continued)

*Primary Examiner* — Sunil K Singh
*Assistant Examiner* — Sara Addisu
(74) *Attorney, Agent, or Firm* — Novak Druce Connolly Bove + Quigg LLP

(57) ABSTRACT

A lathe includes a machine support, a work table, two cross beams and a feeding device. The work table is positioned on the machine support. The two cross beams are mounted on the machine support above the work table. The feeding device includes a cutter. The feeding device is slidably assembled between the two cross beams to obtain support from opposite sides of the two cross beams.

14 Claims, 3 Drawing Sheets

(56) References Cited

U.S. PATENT DOCUMENTS

| | | | |
|---|---|---|---|
| 8,662,802 B2* | 3/2014 | Mischler | 409/235 |
| 8,887,361 B2* | 11/2014 | Yu et al. | 29/27 R |
| 2002/0006764 A1* | 1/2002 | Hanisch et al. | 451/1 |
| 2004/0090126 A1 | 5/2004 | Hsu et al. | |
| 2004/0121890 A1* | 6/2004 | Taga et al. | 483/54 |
| 2006/0270540 A1* | 11/2006 | Takayama et al. | 483/41 |
| 2006/0291971 A1* | 12/2006 | Tanoue et al. | 409/202 |
| 2007/0170140 A1* | 7/2007 | Gaunekar et al. | 212/312 |
| 2008/0271304 A1* | 11/2008 | Grossmann | 29/561 |
| 2009/0067944 A1* | 3/2009 | Motta et al. | 409/202 |
| 2009/0120250 A1* | 5/2009 | Akiyama | 82/133 |
| 2010/0224039 A1* | 9/2010 | Schneider et al. | 82/149 |
| 2010/0313718 A1* | 12/2010 | Meidar et al. | 82/122 |
| 2012/0020753 A1* | 1/2012 | Tullmann et al. | 409/168 |
| 2013/0160619 A1* | 6/2013 | Lee | 82/149 |
| 2014/0020522 A1* | 1/2014 | Yang et al. | 82/118 |
| 2014/0020523 A1* | 1/2014 | Yang et al. | 82/122 |
| 2014/0020524 A1* | 1/2014 | Yang et al. | 82/122 |
| 2014/0020525 A1* | 1/2014 | Yang et al. | 82/122 |
| 2014/0020526 A1* | 1/2014 | Yang et al. | 82/122 |
| 2014/0105699 A1* | 4/2014 | Lechleiter | 409/80 |
| 2014/0341669 A1* | 11/2014 | Fleischer et al. | 409/20 |

FOREIGN PATENT DOCUMENTS

| | | | | | |
|---|---|---|---|---|---|
| CN | 102059390 | A | | 5/2011 | |
| DE | 3416660 | A1 | * | 11/1985 | B23B 3/06 |
| DE | 4408591 | A1 | | 9/1995 | |
| EP | 1166953 | A2 | | 1/2002 | |
| EP | 1166953 | A2 | * | 1/2002 | B23Q 1/01 |
| JP | 55090209 | A | * | 7/1980 | B23B 39/16 |
| JP | 58149101 | A | * | 9/1983 | B23B 3/00 |
| JP | 03073202 | A | * | 3/1991 | |
| JP | 2004130468 | A | | 4/2004 | |
| JP | 2006326740 | A | | 12/2006 | |
| JP | 2013132710 | A | * | 7/2013 | |
| JP | 2013237114 | A | * | 11/2013 | |
| TW | M286741 | | | 2/2006 | |

* cited by examiner

LATHE WITH TWO CROSS BEAMS

CROSS-REFERENCE TO RELATED APPLICATIONS

This application claims all benefits accruing under 35 U.S.C. §119 from China Patent Application No. 201210252857.3, filed on Jul. 20, 2012, in the China Intellectual Property Office, the disclosure of which is incorporated herein by reference. The application is also related to co-pending applications entitled, "MACHINE TOOL WITH UNINTERRUPTED CUTTING" (U.S. patent application Ser. No. 13/705,843); "FEEDING DEVICE AND MACHINE TOOL USING THE SAME" (U.S. patent application Ser. No. 13/705,788); "METHOD FOR MACHINING CURVED SURFACE USING LATHE" (U.S. patent application Ser. No. 13/705,777); "LATHE FOR MACHINING CURVED SURFACES" (U.S. patent application Ser. No. 13/705,713); "FEEDING DEVICE AND MACHINE TOOL USING THE SAME" (U.S. patent application Ser. No. 13/705,611); "LATHE CONTROL SYSTEM" (U.S. patent application Ser. No. 13/705,545); "WORKPIECE HAVING NON-ROTATARY SURFACE MACHINED BY LATHE" (U.S. patent application Ser. No. 13/705,478); "LATHE FOR MACHINING CURVED SURFACES" (U.S. patent application Ser. No. 13/705,383).

BACKGROUND

1. Technical Field

The present disclosure generally relates to lathes, and particularly, to a lathe with two cross beams for high stability.

2. Description of the Related Art

In the related manufacturing field, a tool holder holding a cutter of a lathe is usually mounted on single cross beam. The tool holder moves along the cross beam to adjust positions of the cutter when machining a workpiece. The cutter needs to overcome a great resistance during the machine process. However, it is hard to stably support the tool holder because the tool holder is fixed to one side of the single cross beam. During machining, the lathe shakes easily, which can loosen the cutter adversely affecting accuracy.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
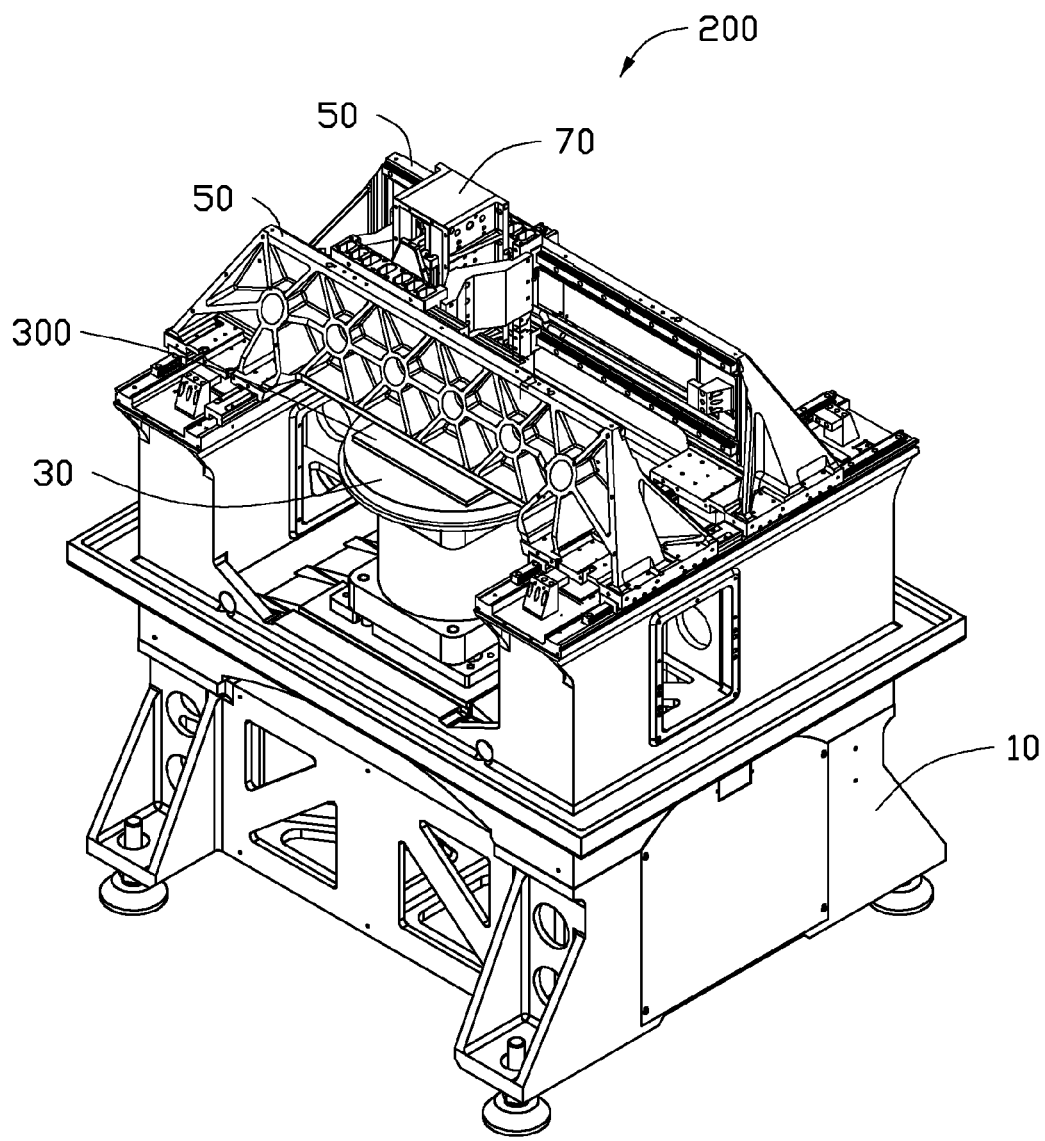
FIG. 1 is an isometric view of an embodiment of a lathe.
Figure 2:
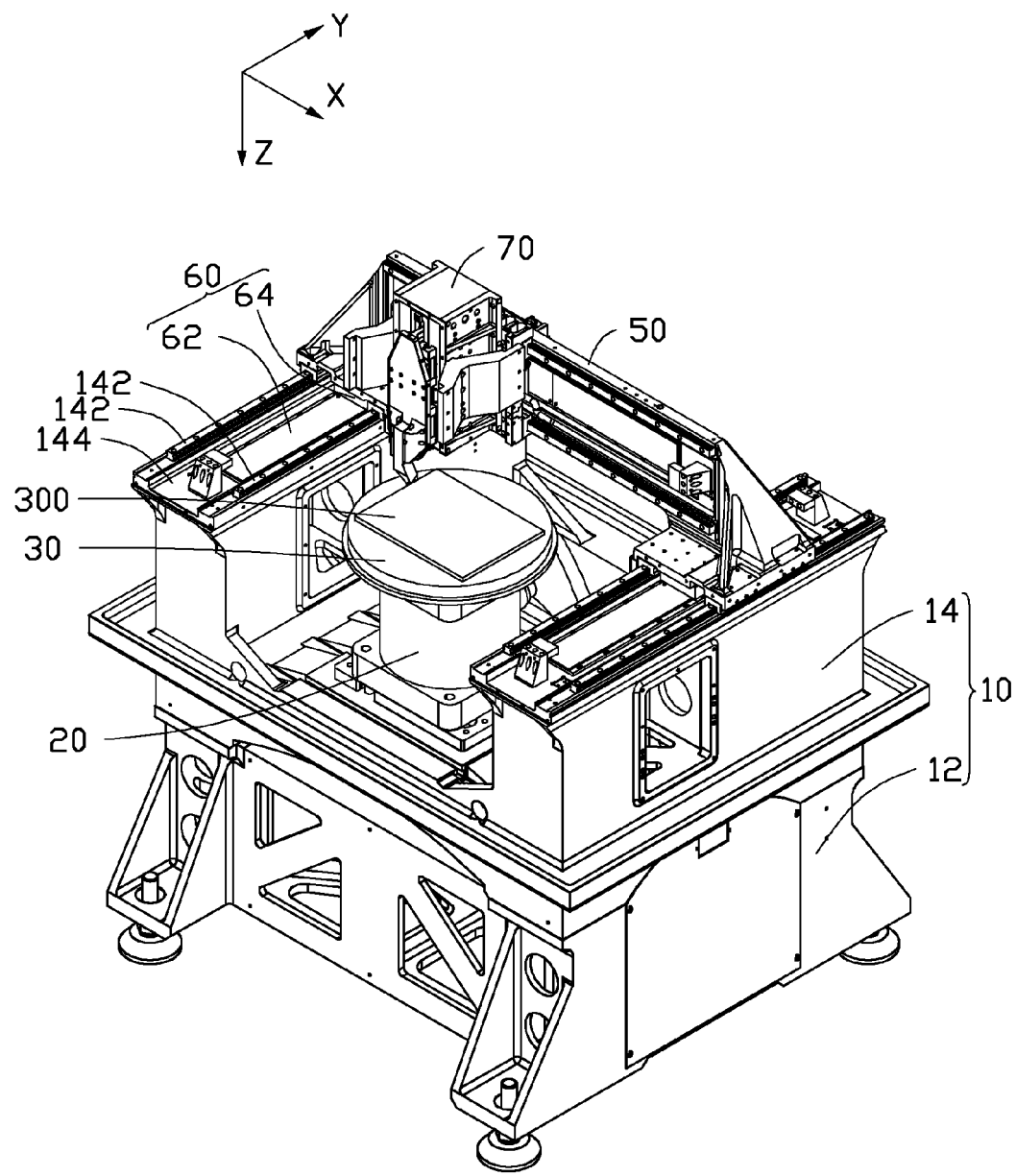
FIG. 2 is a partial, isometric view of the lathe of FIG. 1.
Figure 3:
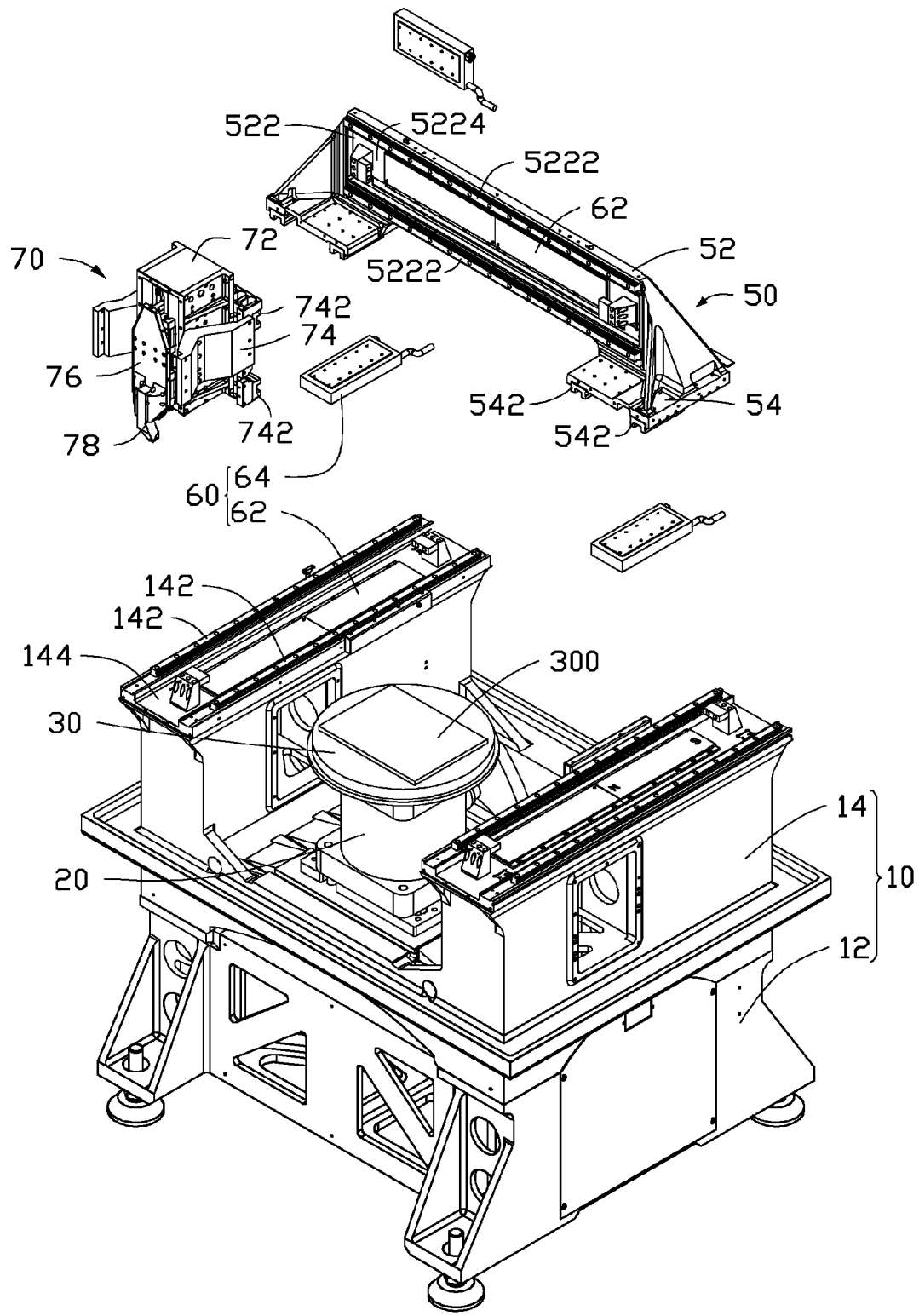
FIG. 3 is a partial, exploded, isometric view of the lathe of FIG. 2.

Referring to FIGS. 1 to 3, an embodiment of a lathe 200 is shown. The lathe 200 is used for machining a curved surface on a workpiece 300 in a single operation. The lathe 200 includes a machine support 10, a rotating driver 20, a work table 30, two cross beams 50, four driving mechanisms 60, and a feeding device 70. The work table 30 holds the workpiece 300 in place, and is supported by the machine support 10. The cross beams 50 are slidably positioned on the machine support 10 above the work table 30. The feeding device 70 is slidably assembled between the cross beams 50. The feeding device 40 can be driven to move along the three axes, X, Y, and Z.

The machine support 10 includes a base 12 and a pair of support bodies 14 positioned substantially parallel to each other on the base 12. Two spaced first sliding rails 142 are positioned in parallel on a surface of each support body 13 away from the base 12. In the illustrated embodiment, the first sliding rails 142 extend substantially parallel to the Y-axis. A first receiving groove 144 is formed on each support body 13 between the corresponding two first sliding rails 142.

The work table 30 is substantially cylindrical, and rotatably positioned on the base 12 via a rotating driver 20 between the two support bodies 14. In the illustrated embodiment, the rotating driver 20 is a direct drive motor.

Two cross beams 50 are oppositely slidably positioned on the support bodies 13 and extend substantially parallel to the X-axis to provide high stability. In the illustrated embodiment, opposite ends of each of the cross beams 50 respectively slidably engage with a corresponding pair of the first sliding rails 142. Each cross beam 50 includes a support portion 52 and two fixing portions 54 positioned at opposite ends of the support portion 52. A sliding surface 522 is positioned on the support portion 52. Two spaced second sliding rails 5222 are positioned on each sliding surface 522 and extend substantially parallel to the X-axis. A second receiving groove 5224 is formed on each sliding surface 522 between the two second sliding rails 5222. Two sliding surfaces 522 are positioned face to face and substantially perpendicular to the work table 30. The fixing portions 54 are substantially rectangular. Two first guiding blocks 542 are positioned substantially parallel to each other on a bottom surface of each fixing portion 54 to slidably engage with the first guiding rails 142. In the illustrated embodiment, the first guiding blocks 542 are "U" shaped.

In the illustrated embodiment, the driving mechanisms 60 are linear motors. Each driving mechanism 60 includes a stator 62 and a rotor 64 moving linearly relative to the stator 62. Two of the driving mechanisms 60 are configured to drive the cross beams 50 to move along the first sliding rails 142. One stator 62 is received in each of the first receiving grooves 144, and one rotor 64 is fixedly installed on each fixing portion 54 of one of the cross beams 50. The other two driving mechanisms 60 are configured to drive the feeding device 70 to move along the second sliding rails 5222. One stator 62 is received in each of the second receiving grooves 5224, and two rotors 64 are fixedly mounted on opposite surfaces of the feeding device 70 facing the cross beams 50.

The feeding device 70 is slidably assembled between the two cross beams 50. The feeding device 70 includes a feeding driving mechanism 72, a mounting seat 74, a tool holder 76, and a cutter 78. The mounting seat 74 sleeves on the feeding driving mechanism 72. Corresponding to the second sliding rails 5222, two second guiding blocks 742 are positioned substantially parallel on each side of opposite sides of the mounting seat 74, which are positioned adjacent to the corresponding cross beam 50. Shapes of the second guiding blocks 742 are similar to the first guiding blocks 542. The second guiding blocks 742 slidably engage with the second sliding rails 5222. One rotor 64 is positioned on each of the opposite sides of the mounting seat 74 having the second guiding blocks 742. The feeding driving mechanism 72 is configured to drive the cutter 78 to move back and forth along the Z-axis. In the illustrated embodiment, the feeding driving mechanism 72 is a linear motor. The tool holder 76 is slidably assembled with the feeding driving mechanism 72. The cutter 78 is fixedly installed on a bottom of the tool holder 76.

In other embodiments, if a cutting process only requires a small lathe 100 with lightweight parts, then the feeding driving mechanism 72 can be omitted, and the tool holder 76 is fixedly mounted on the mounting seat 74. Furthermore, if both the feeding driving mechanism 72 and the mounting seat 74 are omitted, then the tool holder 76 is directly slidably assembled with the two cross beams 50, then the lathe 100 will cost less and the assembly of the lathe 100 will be more convenient with a simpler structure.

In assembly, the work table 30 is positioned between the two support bodies 14. The cross beams 50 are installed on the two support bodies 14, and the first guiding blocks 542 slidably engage with the first sliding rails 142. The second guiding blocks 742 of the feeding device 70 are slidably connected to the second sliding rails 5222 for positioning the feeding device 70 between the cross beams 50.

In use, the workpiece 300 is placed on the work table 30. The rotating driver 20 rotates the work table 30 and the workpiece 300, the feeding device 70 is driven to move along the X-axis, the cross beams 50 are driven to move along the first sliding rails 142 along the Y-axis, and the feeding driving mechanism 72 drives the tool holder 76 and the cutter 78 to move back and forth along the Z-axis to machine the workpiece 300.

In other embodiments, if a cutting process only requires a small lathe 100 with lightweight parts, then to simplify the structure of the lathe 100 and lower costs, the number of the first sliding rails 142 on each support body 14 can be one, and the number of the first guiding blocks 542 on each fixing portion 54 is one, corresponding to the first sliding rail 142 for a more simpler structure and a lower cost of the lathe 100. The number of the second sliding rails 5222 on each cross beam 50 can also be one, and the number of the second guiding blocks 742 on a surface of the mounting seat 74 is one, corresponding to the second sliding rail 5222.

The lathe 100 includes two cross beams 50. The feeding device 70 is slidably positioned between the two cross beams 50. Thereby, the feeding device 70 is supported by the two cross beams 50 from opposite sides for better balance and stability. Vibrations to the feeding device 70 and the cutter 78 are minimized by support of the cross beams 50 during machining. Therefore, the machining accuracy and useful life of the cutter 78 are improved.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A lathe, comprising:
a machine support;
a work table positioned on the machine support;
two cross beams separately mounted on the machine support above the work table; and
a feeding device comprising a cutter,
wherein the feeding device is slidably assembled between the two cross beams to obtain support from opposite sides of the two cross beams, the feeding device further comprises a feeding mechanism, a mounting seat sleeved on the feeding mechanism and a tool holder slidably positioned in the mounting seat, the mounting seat is slidably assembled between the two cross beams, the cutter is fixedly installed on the tool holder, and the feeding mechanism drives the tool holder and the cutter to move back and forth, each of the two cross beams comprises a sliding surface, the two sliding surfaces of the two cross beams are positioned face to face, two second sliding rails are positioned on the sliding surfaces, two second guiding blocks are positioned parallel on each of the opposite sides of the mounting seat positioned adjacent to the cross beams, and the two second guiding blocks slidably engage with the two second sliding rails.

2. The lathe of claim 1, further comprising a rotating driver to rotate the work table.

3. The lathe of claim 1, wherein the machine support comprises a base and two support bodies positioned substantially parallel on the base, and the two cross beams slidably mounted on the pair of support bodies.

4. The lathe of claim 3, wherein a pair of first sliding rails are positioned substantially parallel on each of the pair of support bodies away from the base, each of the two cross beams comprises a support portion and two fixing portion positioned at opposite ends of the support portion, and two first guiding blocks are positioned on each of the two fixing portions to slidably engage with the pair of first sliding rails.

5. The lathe of claim 4, wherein the lathe further comprises two driving mechanisms for driving the cross beams to move along the pair of first sliding rails, each of the two driving mechanisms comprises a rotor and a stator, a first receiving groove is formed on each of the pair of support bodies between the pair of first sliding rails, the stator of each of the two driving mechanisms is received in the first receiving groove, and the rotor of each of the two driving mechanisms is fixedly mounted on each of the fixing portions of one cross beam.

6. The lathe of claim 1, wherein the feeding device further comprises a mounting seat and a tool holder positioned in the mounting seat, the mounting seat is slidably assembled between the two cross beams, and the cutter is fixedly installed on the tool holder.

7. The lathe of claim 1, wherein the lathe further comprises two driving mechanisms for driving the feeding device to move along the two second sliding rails, each of the two driving mechanism comprises a stator and a rotor; a second receiving groove is formed on each two of second sliding rails, the stator of each of the two driving mechanisms is received in one second receiving groove, and each rotor of the two driving mechanisms is fixedly mounted on each of the opposite sides positioned adjacent to the cross beams of the feeding device.

8. A lathe, comprising:
a machine support;
a work table positioned on the machine support;
two cross beams mounted on the machine support above the work table; and
a feeding device comprising a cutter,
wherein the feeding device is slidably assembled between the two cross beams to obtain support from opposite sides of the two cross beams, and the feeding device is capably of being driven to move along the three axes, X, Y, and Z, the feeding device further comprises a feeding mechanism, a mounting seat sleeved on the feeding mechanism and a tool holder slidably positioned in the mounting seat, the mounting seat is slidably assembled between the two cross beams, the cutter is fixedly installed on the tool holder, and the feeding mechanism drives the tool holder and the cutter to move back and forth, each of the two cross beams comprises a sliding surface, the two sliding surfaces of the two cross beams are positioned face to face, two second sliding rails are positioned on the sliding surface, two second guiding blocks are positioned parallel on each of the opposite sides of the mounting seat positioned adjacent to the cross beams, and the two second guiding blocks slidably engage with the two second sliding rails.

9. The lathe of claim 8, further comprising a rotating driver to rotate the work table.

10. The lathe of claim 8, wherein the machine support comprises a base and a pair of support bodies positioned substantially parallel on the base, and the two cross beams are slidably mounted on the pair of support bodies.

11. The lathe of claim 10, further comprising a pair of first sliding rails positioned substantially parallel on each of the pair of support bodies away from the base, each of the two cross beams comprises a support portion and two fixing portion positioned opposite ends of the support portion, and two first guiding blocks are positioned on each of the two fixing portions to slidably engage with the pair of first sliding rails.

12. The lathe of claim 11, further comprising two driving mechanisms for driving the cross beams to move along the pair of first sliding rails, each of the two driving mechanisms comprises a rotor and a stator, a first receiving groove is formed on each of the pair of support bodies between the pair of first sliding rails, the stator of each of two driving mechanisms is received in the first receiving groove, and the rotor of each of the two driving mechanisms is fixedly mounted on each of the fixing portions of one cross beam.

13. The lathe of claim 8, wherein each of the two cross beams comprises a sliding surface, the two sliding surfaces of the two cross beam are positioned face to face, two second sliding rails are positioned on the sliding surface, two second guiding blocks are positioned substantially parallel on each side of the opposite sides of the mounting seat which are positioned adjacent to the cross beams, and the two second guiding blocks slidably engage with the two second sliding rails.

14. The lathe of claim 13, further comprising two driving mechanisms for driving the feeding device to move along the two second sliding rails, each of the two driving mechanisms comprises a stator and a rotor; a second receiving groove is formed on each of the two second sliding rails, the stator of each of the two driving mechanisms is received in the second receiving groove, and the rotor of each of the two driving mechanisms is fixedly mounted on each of the opposite sides positioned adjacent to the cross beams of the mounting seat.

* * * * *